United States Patent [19]
Mitchell

[11] Patent Number: 5,205,228
[45] Date of Patent: Apr. 27, 1993

[54] STAR WHEEL SEED PLANTER

[75] Inventor: Alan Mitchell, Harare, Zimbabwe

[73] Assignee: Tinto Industries Limited, Zimbabwe, Zimbabwe

[21] Appl. No.: 803,878

[22] Filed: Dec. 9, 1991

[30] Foreign Application Priority Data

Mar. 13, 1991 [RH] Zimbabwe .............................. 28/91

[51] Int. Cl.$^5$ .............................................. A01C 5/04
[52] U.S. Cl. ...................................... 111/89; 111/200
[58] Field of Search ................ 111/89, 90, 91, 95, 111/200, 926, 170

[56] References Cited

U.S. PATENT DOCUMENTS

| 4,444,130 | 4/1984 | Ray ........................................ 111/89 |
| 4,628,841 | 12/1986 | Powilleit ............................... 111/89 |
| 5,060,585 | 10/1991 | Alexander ............................ 111/89 |

Primary Examiner—Andrew V. Kundrat
Assistant Examiner—Spencer Warnick
Attorney, Agent, or Firm—Benjamin J. Barish

[57] ABSTRACT

A device for placing seed into the soil at a specific pitch in which radiating spikes of two star wheel formed discs are brought together by rotating the discs synchronously at an angle and that each of the radiating spikes has on its inner side a hollow channel forming an internal closed funnel when the spikes are brought together and opens when by further rotating the spikes move away from each other. The means for placing seed or small objects into the funnels consists of a hub disposed about the axis of rotation of the disc and mounted to rotate with the discs which hub is provided with cells adapted to receive the seed or the other small objects and to release them upon rotation of the discs so they can fall under gravity into the funnel. The device is particularly suitable for the sowing of seed in soil covered by a thick crop residue.

8 Claims, 2 Drawing Sheets

STAR WHEEL SEED PLANTER

FIELD AND BACKGROUND OF THE INVENTION

The present invention relates to a device for placing seed into the soil at fixed intervals and, more particularly, to a tool useful in sowing seed, or inserting similar objects, into soil at fixed distance intervals along the direction of travel of the tool.

It is frequently desirable to sow seeds or insert other objects into the soil at fixed intervals apart. One could accomplish this by first creating holes for the seeds at accurately measured intervals and then sowing the seeds. This procedure is, however, highly labor intensive, requiring two passes to accomplish the job.

It is desirable to automate the sowing process so that the holes are dug and the seeds sown in a single pass. However, such a procedure makes it difficult to sow the seeds at constant distance intervals, since the distance between seeds may depend on the speed of travel of the tool and/or on the judgment of the tool operator. It is especially difficult to sow seeds at fixed intervals when the soil is covered by a thick crop overburden.

There is thus a widely recognized need for a device which will make it possible to dig holes and sow seed in a single pass, and which will place the seed at regular distance intervals along the direction of travel of the device.

SUMMARY OF THE INVENTION

According to the present invention there is provided a device for inserting seeds into soil at fixed distance intervals, comprising two discs, rotatable about the same substantially horizontal axis, the discs having radially projecting spikes, the discs being oriented non-parallel to each other so as to bring the interior surfaces of the spikes into close proximity with each other at one point in the rotation, thereby forming a channel between said spikes for the insertion of the seed by said spikes into the soil, means for rotating the discs synchronously with each other, and means for feeding the seed to the channel.

According to further features in preferred embodiments of the invention described below, the device includes a rotating hub which may feature cells for receiving seed and for holding the seed, as with the aid of a non-rotating cover, until the spikes of the device reach a particular orientation, typically at or near a vertically downward alignment, at which time the seeds are released from the cell, fall by gravity through the channel and enter the soil.

According to a further feature of a preferred embodiment, the two discs may be made to rotate at a fixed ratio of angular velocities relative to each other, preferably synchronously, using one or more interlocking pegs or a metering gear.

According to a further feature of an embodiment according to the present invention, a cover plate is mounted surrounding a portion of the spikes which is capable of preventing vegetative matter from entering between the spikes.

The star wheel planter according to the present invention is particularly suitable for sowing seeds in soil covered by a rather thick crop residue, without the necessity of removing the crop residue. A proper penetration is achieved through the crop residue and the seeds are placed into the soil at regular distance intervals.

The device of the present invention consists of two discs in the shape of a star wheel with radially projecting spikes. The two discs are mounted so as to rotate about the same substantially horizontal axis of rotation. However, the discs are not mounted perpendicular to their common axis of rotation. Rather, they are angled so as to be non-perpendicular to the axis. The angle and the precise mounting location of the two discs are selected so that the spikes of the two discs are brought into very close proximity, preferably into contact, at one point during each rotation of the discs.

The surface of each spike which faces the adjoining disc is shaped so that when it comes in contact, or near contact, with the adjoining disc, a hollow channel is formed which is capable of allowing seed to pass radially from the hub, through the channel, to the tip of the spikes and out into the soil.

The means for feeding the seed into the channel includes a hub disposed about the axis of rotation of the discs and mounted so as to rotate with the discs. The hub features a number of cells, one cell for each pair of opposed spikes. Each cell is capable of receiving, holding, and releasing the seed at the proper times.

The hub is preferably provided with a cover to retain the seed in the cell until the seed is to be released and allowed to fall under gravity into the channel.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a seed planter which is capable of sowing seed at fixed distance intervals. Specifically, the device of the present invention can be used to dig holes and plant seeds at distance interval which are precise and which do not depend on the speed of travel of the device or on the judgment of the operator.

Figure 1:
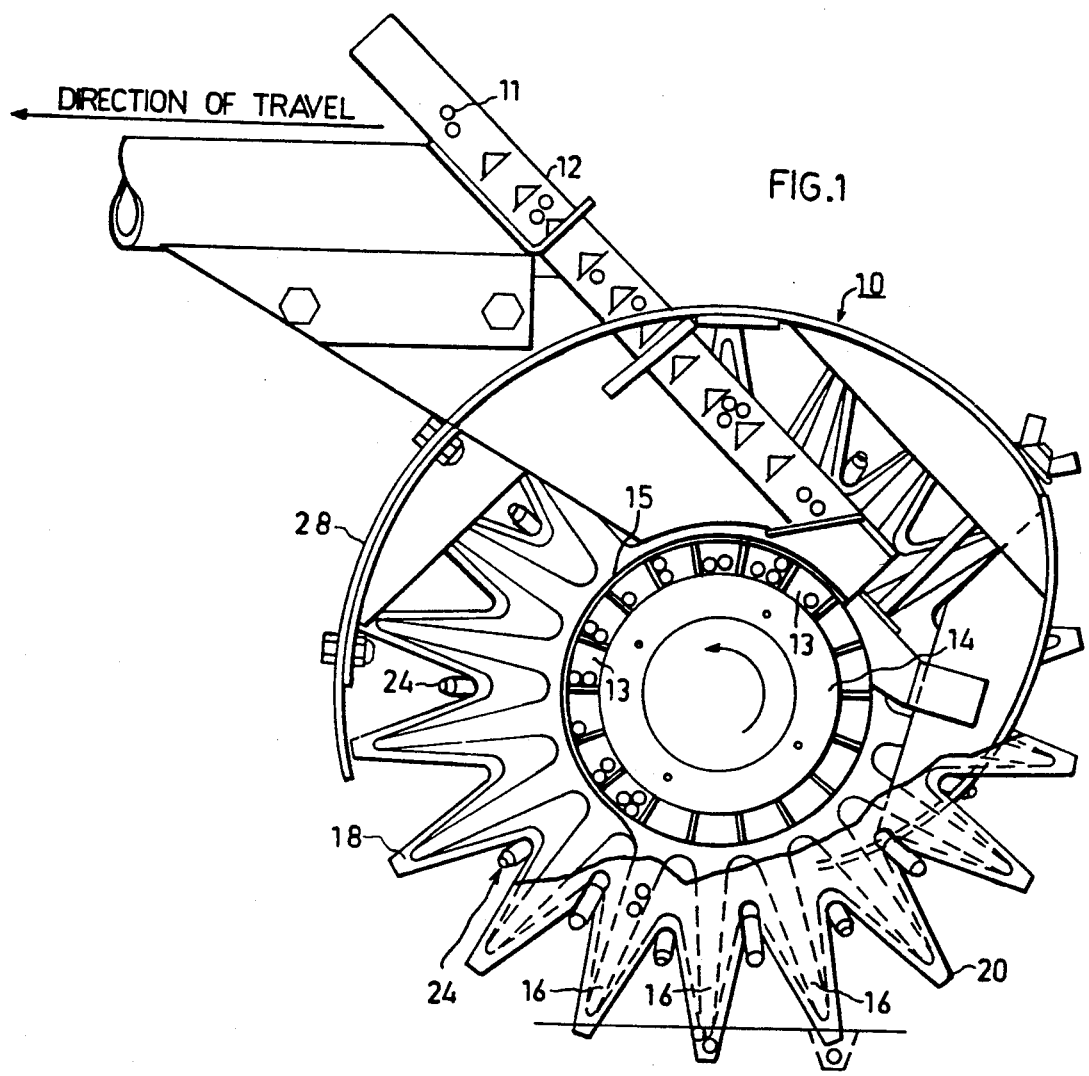
FIG. 1 is a cutaway view of a device according to the present invention with the near disc removed to better show the operating principles of the device.
Figure 2:
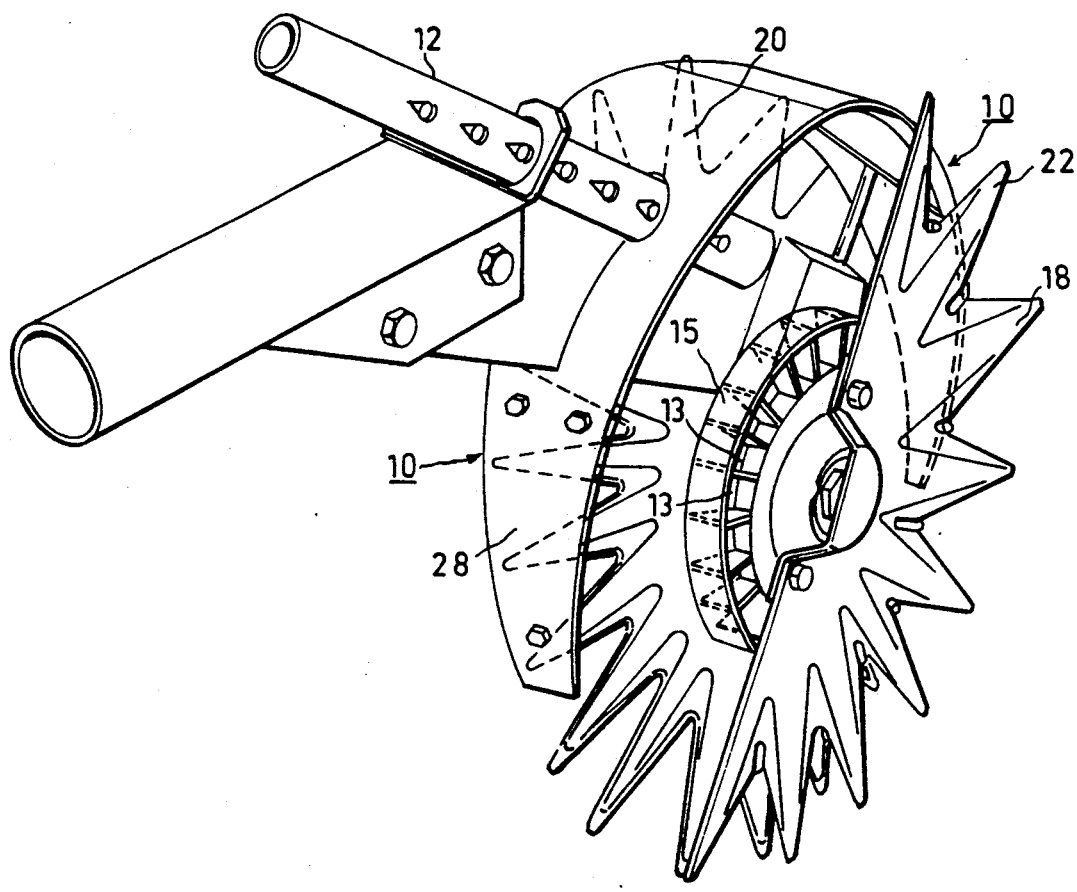
FIG. 2 is a perspective drawing of the device of FIG. 1.

Referring now to the drawing, FIGS. 1 and 2 illustrate the operating principles of the present invention. The planter, designated generally as 10 is mounted onto a tractor or similar vehicle (not shown) in the same manner as would typical plow or other agricultural implements. Seed 11 flows downwardly through a conduit or pipe 12 toward planter 10 where seed 11 enters into and is retained by cells 13 of a rotating hub 14. Any convenient means may be used to meter the amount of seed 11 which enters each cell 13. Seed 11 is retained within cell 13 by a cover 15 until cell 13 is positioned in such a manner, typically vertically, that it is desirable to release seed 11 from cell 13.

From cell 13 seed 11 moves into a channel 16, which is formed by the simultaneous coming together of two opposing spikes 18 of the rotating star wheel-shaped discs, 20 and 22, which spikes 18 are shaped so as to create a channel 16 whenever two opposing spikes 18 come together, typically at the most downward point of travel of spikes 18. Channel 16 disappears when, upon further rotation, spikes 16 move horizontally away from each other.

As planter 10 is pulled over the ground, channels 16 are formed and destroyed through the successive coming together and pulling apart of spikes 18 as discs 20 and 22 rotate.

Discs 20 and 22 are rotated at angular velocities which will cause channels 16 to form. In the typical case, two identical discs 20 and 22 will be used and it will be desirable to have both rotate at the same angular velocity. However, it may in some cases be desirable to have two discs with different numbers of spikes and/or to rotate the two discs at different angular velocities.

Synchronization of the rotation of discs 20 and 22 may be achieved using one or more interlocking pegs 24 which are provided on one disc wheel and which engage with the base of spikes 18 on the other wheel, to ensure that the wheels rotate in unison. Pegs 24 are sized such that they are able to engage spikes 18 during the entire rotation cycle. An alternative method of controlling the rotation rates of discs 20 and 22 is to provide metering gears (not shown) connected to discs 20 and 22.

The angular velocity of discs 20 and 22 is such that channel 16 opens when spikes 18 have penetrated through the crop residue and have formed a hole in the soil 26. By moving planter 10 forward, discs 20 and 22 rotate and planter 10 places seed 11 into soil 26 at regular and precise distance intervals.

It will be appreciated that the distance interval can be varied by using discs of different spike length and/or different number of spikes. It will also be appreciated that the distance interval will also depend on the degree to which the spikes are made to penetrate the soil. For example, using the same set of discs, a smaller distance interval will be obtained where the soil penetration is deeper than when the soil penetration is more shallow.

FIG. 2 clearly shows discs 20 and 22 which are mounted at an angle to each other and which come together at a point in their rotational travel. In this way, during each rotation, each pair of opposing spikes 18 of discs 20 and 22 forms a channel 16, which receives seed 11 from cell 13, preferably by gravity, and allows seed 11 to fall through channel 16 and into the hole in soil 26. Further rotation of discs 20 and 22 brings cell 13 into position to receive additional seed 11 for deposit into soil 26 during the next rotation.

It is preferable to include a cover plate 28 mounted so as to surround a portion of discs 20 and 22 for protecting the discs and for preventing soil or other debris from entering between the converging spikes 18.

Planter 10 can be mounted on a spring loaded beam (not shown) which can be biased in the direction of soil 26 to achieve the desired extent of penetration through any overburden and soil. Any convenient number of planters 10 can be mounted on a tool bar to allow the simultaneous sowing of seeds in parallel rows.

Although the illustrated device has been described in its application as a seed planter, it is readily appreciated that the principles of the present invention can be used in other devices in which it is desired to insert small objects into the soil at regular distances apart.

While the invention has been described with respect to one preferred embodiment, it will be appreciated that many variations, modifications and other applications of the invention may be made.

What is claimed is:

1. A device for inserting seeds into soil at fixed intervals, comprising:
   (a) two discs, rotatable about the same substantially horizontal axis, said discs having radially projecting spikes, said discs being oriented non-parallel to each other so as to bring said spikes into close proximity with each other at one point in the rotation, thereby forming a channel between said spikes for the insertion of the seed by said spikes into the soil;
   (b) means for rotating said discs synchronously with each other; and
   (c) means for feeding the seed to said channel.

2. A device as in claim 1, wherein said means for feeding the seed to said channel comprises a hub disposed about said axis of rotation of said discs, said hub being capable of rotating with said discs.

3. A device as in claim 2, wherein said means for feeding the seed to said channel further comprises cells connected to said hub, said cells being capable of receiving the seed and releasing the seed upon rotation of said discs so the seed can fall under gravity into said channel.

4. A device as in claim 3, further comprising a cover non-rotatably mounted near a portion of the circumference of said cells, said cover being capable of preventing the seeds in said cells from exiting said cells until said spikes are so positioned that it is desirable that the seeds be released and fall under gravity into said channel.

5. A device as in claim 1, further comprising a cover plate non-rotatably mounted near a portion of the circumference of said discs, said cover plate being capable of preventing vegetative matter from entering said spikes.

6. A device as in claim 4, further comprising a covering plate non-rotatably mounted near a portion of the circumference of said discs, said cover plate being capable of preventing vegetative matter from entering said spikes.

7. A devices as in claim 1 wherein said means for rotating said discs synchronously with each other includes an interlocking peg mounted on one of said discs and capable of engaging said other disc.

8. A device as in claim 6 wherein said means for rotating said discs synchronously with each other includes an interlocking peg mounted on one of said discs and capable of engaging said other disc.

* * * * *